(12) United States Patent
Murata

(10) Patent No.: US 8,302,572 B2
(45) Date of Patent: Nov. 6, 2012

(54) INTERNAL COMBUSTION ENGINE WITH VARIABLE VALVE GEAR

(75) Inventor: Shinichi Murata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/709,959

(22) Filed: Feb. 22, 2010

(65) Prior Publication Data

US 2010/0212614 A1 Aug. 26, 2010

(30) Foreign Application Priority Data

Feb. 23, 2009 (JP) ................................ 2009-039231

(51) Int. Cl.
*F01L 1/34* (2006.01)

(52) U.S. Cl. ............. 123/90.15; 123/909.16; 123/90.17; 123/347; 123/348

(58) Field of Classification Search ............... 123/90.16, 123/90.15, 90.17, 347, 348

See application file for complete search history.

(56) References Cited

FOREIGN PATENT DOCUMENTS

| JP | 60-22022 A | 2/1985 |
|----|------------|--------|
| JP | 60-26122 A | 2/1985 |
| JP | 60-153411 A | 8/1985 |
| JP | 61-218726 A | 9/1986 |
| JP | 63-105230 A | 5/1988 |
| JP | 02-199206 A | 8/1990 |
| JP | 3-10004 U | 1/1991 |
| JP | 3-88907 A | 4/1991 |
| JP | 3-202602 A | 9/1991 |
| JP | 7-269381 A | 10/1995 |
| JP | 8-303267 A | 11/1996 |
| JP | 9-170462 A | 6/1997 |
| JP | 11-229913 A | 8/1999 |
| JP | 2002-54410 A | 2/2002 |

*Primary Examiner* — Ching Chang

(74) *Attorney, Agent, or Firm* — Birch, Stewart, Kolasch & Birch, LLP

(57) ABSTRACT

In an internal combustion engine with a variable valve gear, which comprises a first intake valve and a second intake valve for each cylinder, configured to be driven by a first intake cam and a second intake cam, respectively, and a cam phase change mechanism configured to vary at least the phase of the second intake cam, the second intake cam is set so that the open period of the second intake valve is longer than that of the first intake valve.

3 Claims, 5 Drawing Sheets

CROSS SECTION A-A

ONE-SIDE VALVE-OPEN PERIOD
INITIAL STAGE OF INTAKE STROKE

CROSS SECTION a-a

ONE-SIDE VALVE-OPEN PERIOD
FINAL STAGE OF COMPRESSION STROKE

CROSS SECTION b-b

INTERNAL COMBUSTION ENGINE WITH VARIABLE VALVE GEAR

BACKGROUND OF THE INVENTION

1. Field of the Invention

The present invention relates to an internal combustion engine with a cam phase change mechanism capable of changing the phase of an intake cam.

2. Description of the Related Art

Conventionally, there are internal combustion engines that comprise a cam phase change mechanism as a variable valve gear, which changes the phase of an intake cam to vary the opening and closing timings of an intake valve. Further, a technique has been developed in which the cam phase change mechanism is applied to internal combustion engines that are provided with a plurality of intake valves for each cylinder. According to this technique, the opening and closing timings of only some of the intake valves are varied in accordance with the engine load and speed.

In one such internal combustion engine, the opening and closing timings of some of the intake valves are delayed in, for example, a high-load, high-speed mode, whereby the open period of the intake valves, including those which are not subjected to delay-angle control, is extended to increase the flow rate of intake air for the security of output (Jpn. Pat. Appln. KOKAI Publication No. 3-202602).

In the internal combustion engine described in the above patent document, however, the closing timing of each intake valve is set so as not to be greatly delayed relative to the bottom dead center, whereby blowback is prevented, in order to ensure stable combustion in a low-speed mode. Thus, a long valve-open period cannot be secured, and the fuel efficiency may be reduced by pumping loss.

SUMMARY OF THE INVENTION

The object of the present invention is to provide an internal combustion engine with a variable valve gear, capable of securing combustion stability and mitigating pumping loss to improve its fuel efficiency.

In order to achieve the above object, the present invention provides an internal combustion engine with a variable valve gear, which comprises a first intake valve and a second intake valve for each cylinder, configured to be driven by a first intake cam and a second intake cam, respectively, and a cam phase change mechanism configured to vary at least the phase of the second intake cam, wherein the second intake cam is set so that the open period of the second intake valve is longer than that of the first intake valve.

Thus, the open period of the second intake valve is set to be longer than that of the first intake valve, so that the valve-open period can be greatly changed by varying the phase of the second intake cam.

Since the open period of the second intake valve is different from that of the first intake valve, in particular, a one-side valve-open period during which one of the first and second intake valves is open is always provided within the intake valve-open period without regard to phase change of the second intake cam. Therefore, reduction of swirls by interference between intake airflows in a combustion chamber can be suppressed, so that combustion stability can be secured. Thus, the intake valve-open period can be greatly increased in the delaying direction, so that pumping loss can be mitigated to improve the fuel efficiency.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIGS. 6A to 6C are time charts showing lifts of intake valves, in which FIG. 6A shows a low-load mode, FIG. 6B shows a high-speed, high-load mode, and FIG. 6C shows a low-speed, low-load mode or start mode; and FIGS. 7A and 7B are reference diagrams showing swirls, in which FIG. 7A shows an initial stage of an intake stroke during a one-side valve-open period in the low-load mode, and FIG. 7B shows the second half of a compression stroke during the one-side valve-open period in the low-load mode.

DETAILED DESCRIPTION OF THE INVENTION

One embodiment of the present invention will now be described with reference to the accompanying drawings.

Figure 1:
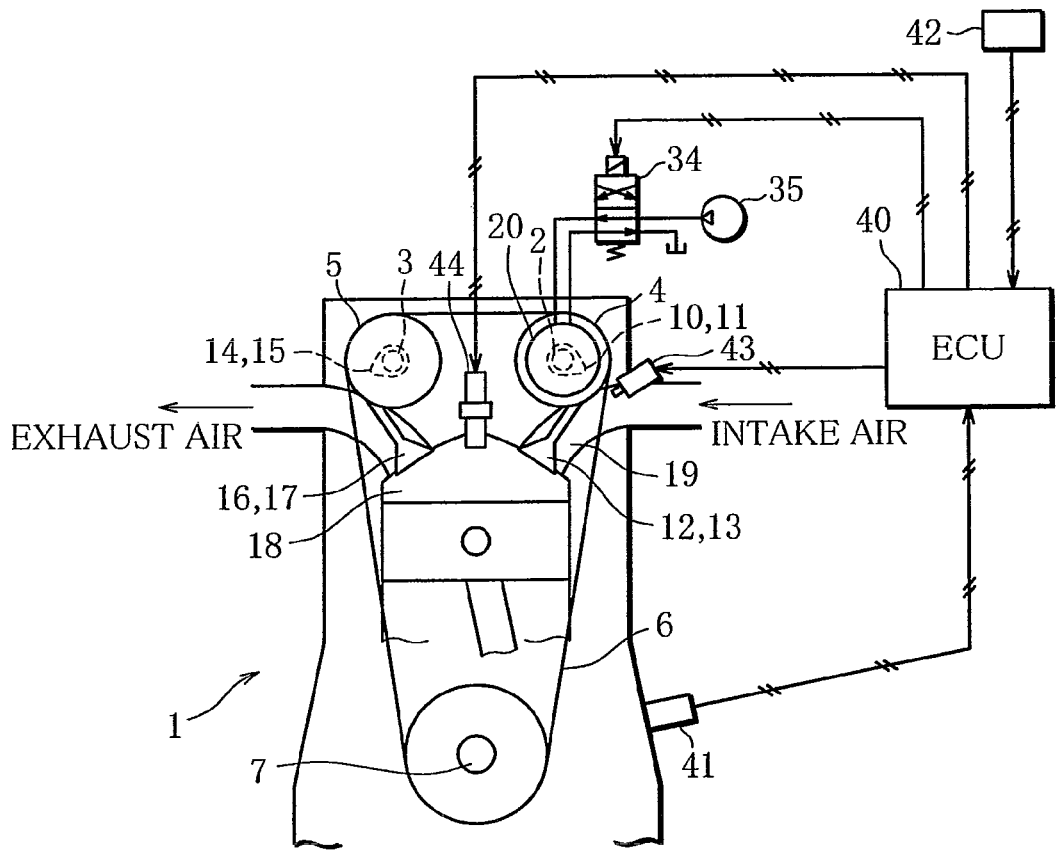
FIG. 1 is a schematic structure diagram of an engine according to one embodiment of the invention.

FIG. 1 is a schematic structure diagram of an internal combustion engine (engine 1) with a variable valve gear according to the present embodiment.

As shown in FIG. 1, the engine 1 of the present embodiment comprises a DOHC valve train. Cam sprockets 4 and 5 are connected, respectively, to the respective front ends of an intake camshaft 2 and an exhaust camshaft 3 of the engine 1. The cam sprockets 4 and 5 are coupled to a crankshaft 7 by a chain 6. As the crankshaft 7 rotates, the intake and exhaust camshafts 2 and 3 are rotated together with the cam sprockets 4 and 5. Intake valves 12 and 13 are opened and closed by intake cams 10 and 11 on the intake camshaft 2, and exhaust valves 16 and 17 by exhaust cams 14 and 15 on the exhaust camshaft 3. A combustion chamber 18 of the engine 1 is pent-roof-shaped.

Figure 2:
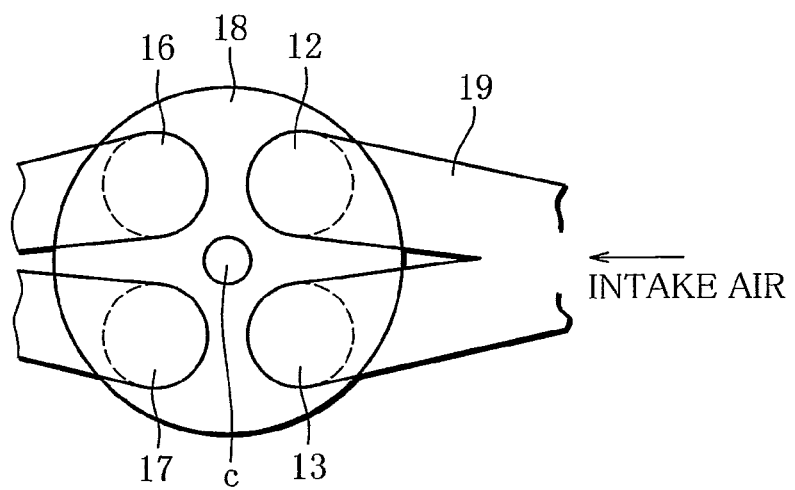
FIG. 2 is a reference diagram showing a layout of valves and a port.

FIG. 2 is a reference diagram showing a layout of the valves and a port of the engine 1.

As shown in FIG. 2, each cylinder of the engine 1 is provided with two intake valves (first and second intake valves 12 and 13) and two exhaust valves 16 and 17. The first and second intake valves 12 and 13 are arranged longitudinally on the right (as in FIG. 2) of a central part c of the combustion chamber 18. The two exhaust valves 16 and 17 are arranged longitudinally on the left of the central part c of the chamber 18.

Further, an intake port 19 of the engine 1 extends obliquely toward the combustion chamber 18 from a position off to the upper right of it, branches off at a point just short of the chamber 18, and communicates with valve holes that are opened and closed by the first and second intake valves 12 and 13, individually.

Furthermore, the valve train of the second intake valve 13 comprises a cam phase change mechanism 20 that varies the phase of the second intake cam 11.

Figure 3:
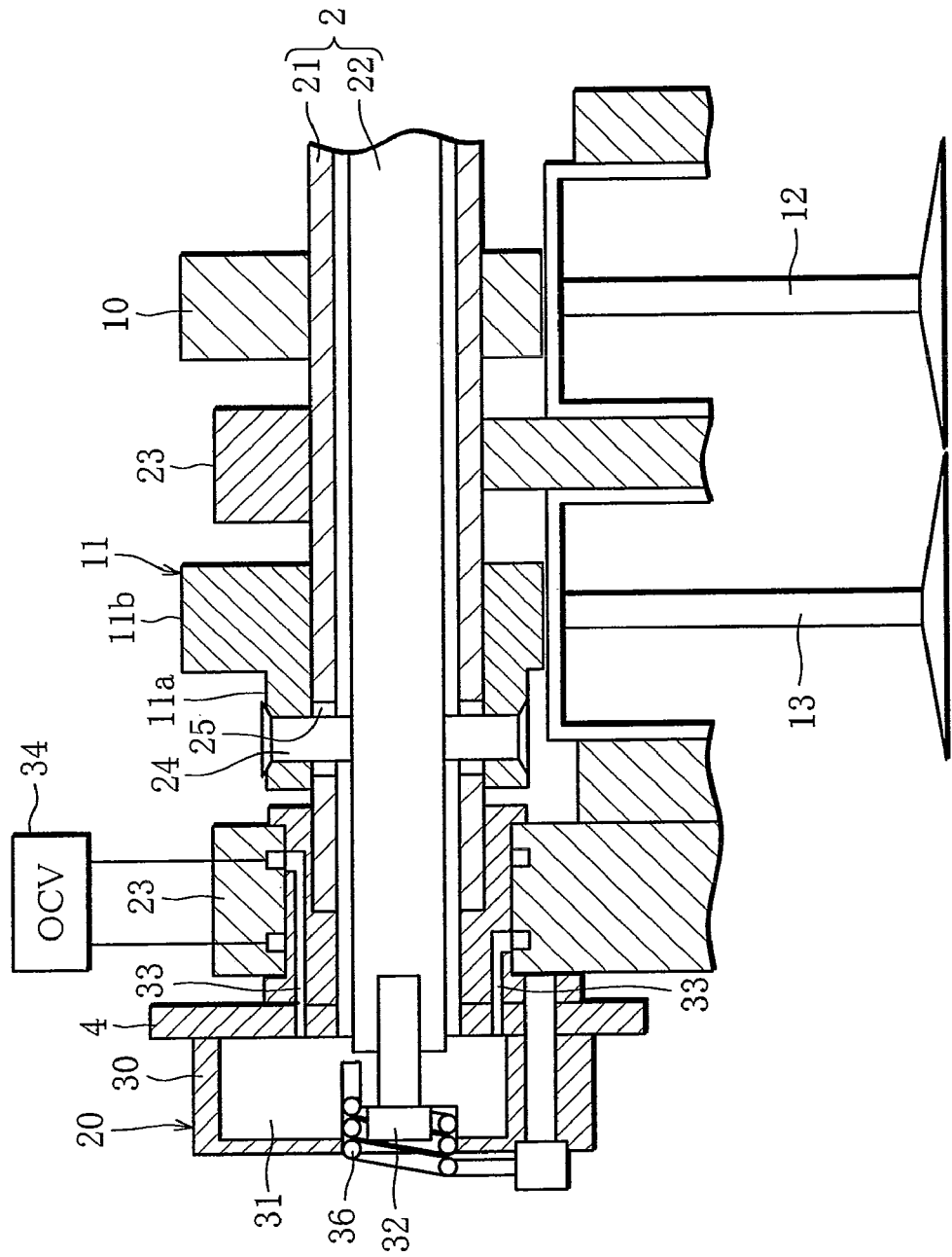
FIG. 3 is a longitudinal sectional view showing the structure of a valve train.
Figure 4:
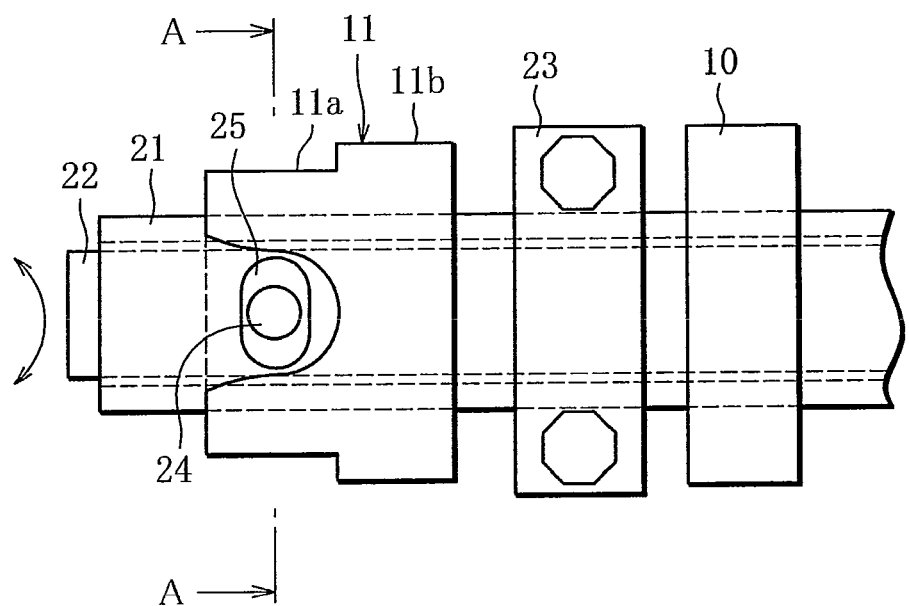
FIG. 4 is a top view showing the structure of the valve train.
Figure 5:
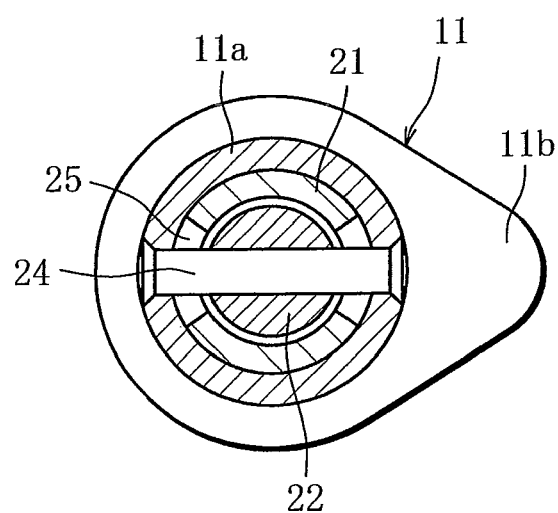
FIG. 5 is a sectional view showing the structure of a mounting portion for the second intake cam.

FIGS. 3 to 5 are structure views of valve trains. FIG. 3 is a longitudinal sectional view, FIG. 4 is a top view, and FIG. 5 is a sectional view showing the structure of a mounting portion for the second intake cam 11.

As shown in FIGS. 3 to 5, the intake camshaft 2 has a dual structure comprising a hollow first intake camshaft 21 and a second intake camshaft 22 inserted in the first intake camshaft. The first and second intake camshafts 21 and 22 are arranged concentrically with a gap between them and pivotably supported by a support portion 23 formed on a cylinder head of the engine 1. The first intake cam 10 for driving the first intake valve 12 is fixed to the first intake camshaft 21. Further, the second intake cam 11 is pivotably supported on the first intake camshaft 21. The second intake cam 11 comprises a substantially cylindrical support portion 11a and a cam portion 11b. The first intake camshaft 21 is inserted in the support portion 11a. The cam portion 11b protrudes from the outer periphery of the support portion 11a and serves to drive the second intake valve 13. The second intake cam 11 and the second intake camshaft 22 are fixed to each other by a fixing pin 24. The fixing pin 24 penetrates the support portion 11a of the second intake cam 11 and the first and second intake camshafts 21 and 22. The fixing pin 24 is inserted in a hole in the second intake camshaft 22 without a substantial gap, and its opposite end portions are crimped and fixed to the support portion 11a. A slot 25 through which the fixing pin 24 is passed is formed in the first intake camshaft 21 so as to extend circumferentially.

The cam phase change mechanism 20 is disposed on one end portion of the first intake camshaft 21. The mechanism 20 is a conventional vane-type cam phase change mechanism configured so that a vane rotor 31 is pivotably disposed in a housing 30, which is integral with the cam sprocket 4, and that the second intake camshaft 22 is fastened to the vane rotor 31 by a bolt 32.

Further, the cam phase change mechanism 20 is provided with a spring 36. The spring 36 is disposed between the housing 30 and the vane rotor 31 and serves to urge the rotor 31 in an advance-angle direction. Thus, the second intake cam 11 is urged in the advance-angle direction.

The cam phase change mechanism 20 is connected with an oil control valve (hereinafter referred to as OCV) 34 by an oil passage 33 formed in the first intake camshaft 21 and the support portion 23. The cam phase change mechanism 20 can continuously adjust the phase angle of the second intake camshaft 22 relative to the cam sprocket 4, that is, the opening and closing timings of the second intake valve 13, in such a manner that the vane rotor 31 is pivoted by a hydraulic fluid supplied from an oil pump 35 of the engine 1 to an oil chamber defined between the vane rotor 31 and the housing 30 as the OCV 34 is switched, as shown in FIG. 1.

An ECU 40 is provided with an input-output device (not shown), storage devices such as ROM and RAM, central processing unit (CPU), etc., and generally controls the engine 1.

Various sensors, such as a crank angle sensor 41 and a throttle sensor 42, are connected to the input side of the ECU 40. The crank angle sensor 41 detects the crank angle of the engine 1. The throttle sensor 42 detects the opening of a throttle valve (not shown). Further, a fuel injection valve 43, spark plug 44, etc., as well as the OCV 34, are connected to the output side of the ECU 40. The ECU 40 determines the ignition timing, injection quantity, etc., based on detected information from the sensors, and drivingly controls the spark plug 44 and the fuel injection valve 43. In addition, the ECU 40 drivingly controls the OCV 34, that is, the cam phase change mechanism 20.

Figure 6A:
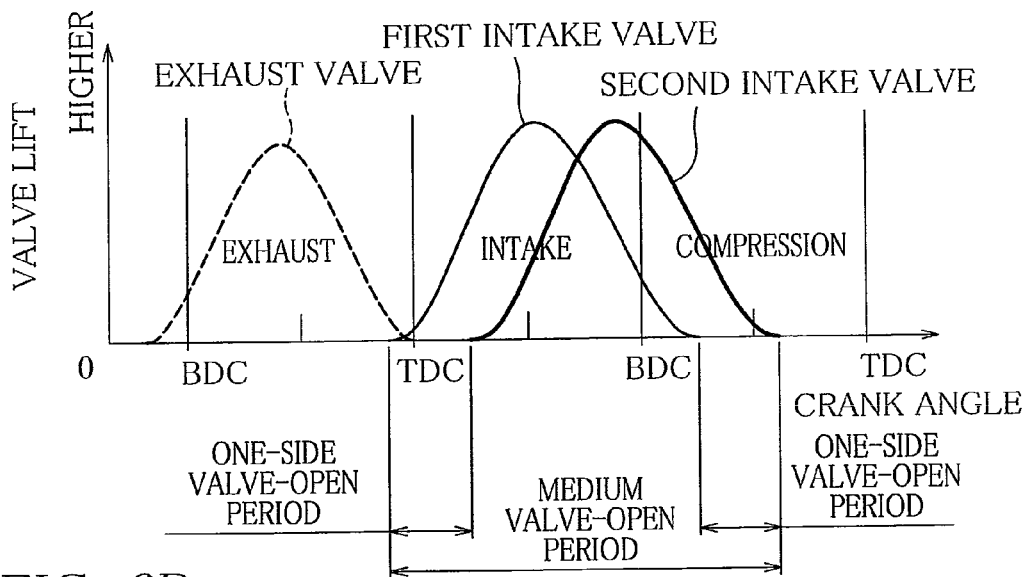
Figure 6B:
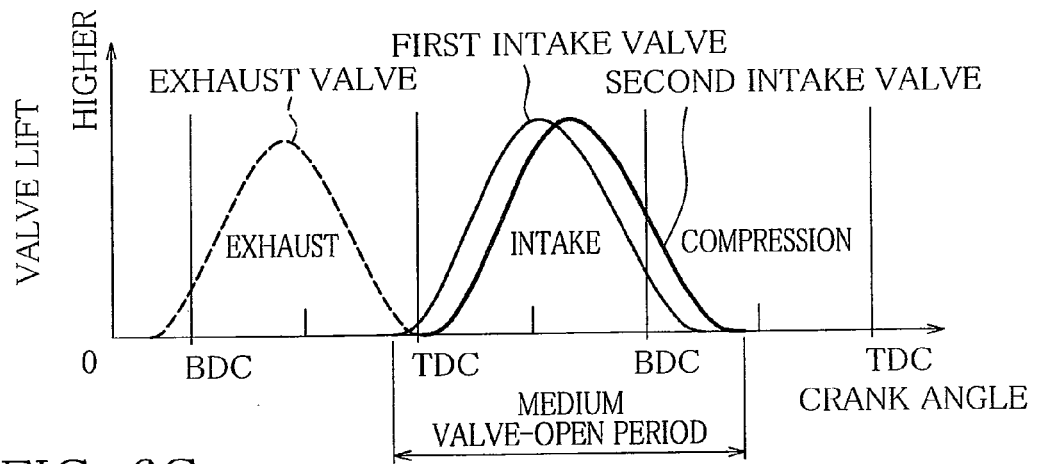
Figure 6C:
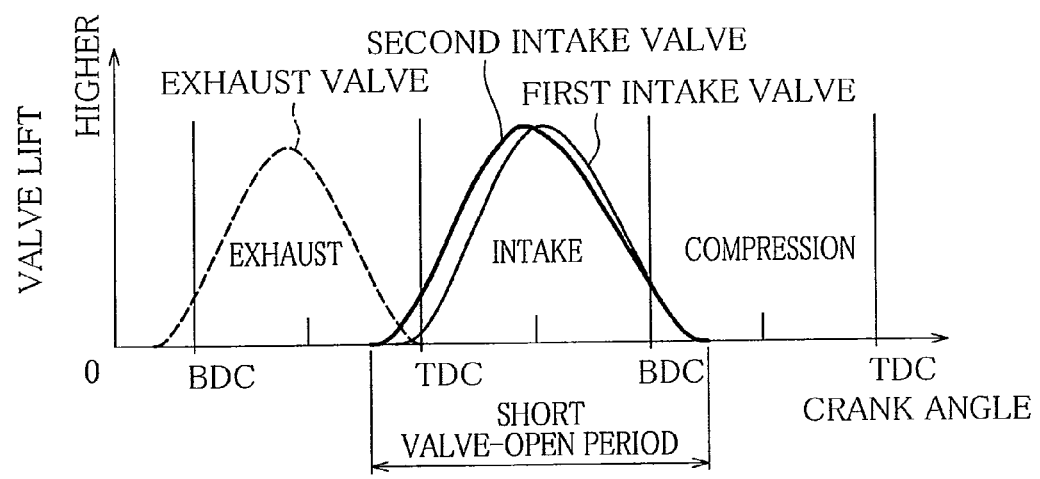

FIGS. 6A to 6C are time charts showing lifts of the intake valves, in which FIG. 6A shows a low-load mode, FIG. 6B shows a high-speed, high-load mode, and FIG. 6C shows a start mode or low-speed, high-load mode.

In the present embodiment, as shown in FIGS. 6A to 6C, the open period of the second intake valve 13 is set to be longer than that of the first intake valve 12. Further, the opening timing of the first intake valve 12 is fixed near a top dead center.

Based on input signals from the crank angle sensor 41 and the throttle sensor 42, the ECU 40 obtains an engine speed N and a load L, and based on these engine speed and load, operatively controls the operatively controlled variable of the cam phase change mechanism 20, that is, the opening and closing timings of the second intake valve 13.

Specifically, the ECU 40 delays the opening and closing timings of the second intake valve 13 in the low-load mode, as shown in FIG. 6A. When this is done, the intake valve-open period is a period between the opening timing of the first intake valve 12 and the delayed closing timing of the second intake valve 13, and it is longer than in the case where the valve timing of the second intake valve 13 is not delayed. At this time, moreover, the closing timing of the second intake valve 13 is set nearer to the top dead center (TDC) than to a bottom dead center (BDC) in the most delayed state.

In the high-speed, high-load mode, as shown in FIG. 6B, on the other hand, the ECU 40 sets the delay amount of the opening and closing timings of the second intake valve 13 to be lower than in the low-load mode shown in FIG. 6A so that the closing timing of the second intake valve 13 is within the second half of a compression stroke or that the second intake valve 13, for example, is closed near the region where intake air is pushed back into the intake port 19 by a piston.

In the start mode or low-speed, high-load mode, as shown in FIG. 6C, moreover, the ECU 40 advances the opening and closing timings of the second intake valve 13. The closing timing of the second intake valve 13 in the most advanced state is controlled to be substantially coincident with that of the first intake valve 12. Therefore, the intake valve-open period becomes shortest, when compared with the cases of the low-load mode shown in FIG. 6A and the high-speed, high-load mode shown in FIG. 6B. Since the open period of the second intake valve 13 is set to be longer than that of the first intake valve 12, the opening timing of the second intake valve 13 is advanced ahead of that of the first intake valve 12 by matching their respective closing timings. Thereupon, the open period of the second intake valve 13 slightly overlaps those of the exhaust valves 16 and 17.

Thus, according to the present embodiment, the valve-open period of the intake valve means as a whole is extended in the low-load mode, so that pumping loss can be mitigated to improve the fuel efficiency. When the second intake valve 13 is in the most delayed angle position, in particular, its closing timing is within the second half of the compression stroke nearer to the next top dead center than to the bottom dead center, so that pumping loss can be greatly mitigated. Since the opening timing of the first intake valve 12 is set near the top dead center, moreover, pumping loss in an initial stage of an intake stroke can also be mitigated. If the opening timing of the first intake valve 12 is near the top dead center, furthermore, there is a small overlap in the case where the closing timings of the exhaust valves 16 and 17 are set near the top dead center. Therefore, the amount of internal EGR gas from the exhaust-valve side is reduced, so that reduction of combustibility can be avoided.

In the high-speed, high-load mode, on the other hand, the closing timing of the second intake valve 13 is within the first half of the compression stroke, so that the charging efficiency of the intake air can be enhanced to secure the output by closing the valve 13 near the region where the intake air is pushed back into the intake port 19 by the piston.

In the start mode or low-speed, high-load mode, moreover, the opening and closing timings of the second intake valve 13 are advanced to provide a one-side valve-open period during which only the second intake valve 13 is open in an initial stage of the intake valve-open period. Thereupon, swirls are generated to accelerate mixing of fuel and air and gasification of fuel, so that the engine can be started with a small amount of fuel, and combustibility can be improved to enhance the exhaust performance. Since the exhaust valves 16 and 17 have some large overlap, furthermore, the intake air blows back into the intake port 19 when the intake valves are opened and sweeps and atomizes the fuel that adheres to the intake port 19. Thus, as the intake air temperature is increased by the exhaust, gasification of the fuel can be accelerated, so that combustibility can rather be improved even if the internal EGR gas is increased. Further, exhaust gas containing a plenty of unburned fuel is discharged into an exhaust port in the second half of an exhaust stroke. Since the throttle valve (not shown) is closed, however, a negative pressure is formed in the intake port, so that the exhaust gas once discharged in the second half of the exhaust stroke is sucked out to the intake port side. Then, the exhaust gas is sucked in again and burned, so that unburned fuel components are reduced. If the intake and exhaust valves are located individually on opposite slopes of the pent-roof-shaped combustion chamber, in this case, the exhaust gas is smoothly sucked out to the intake port side and sucked in again in the next stroke. Then, liquid fuel adhering to the wall surface of the intake port is blown away, whereupon gasification of the fuel is accelerated together with mixing of air and fuel and of internal EGR gas and unburned fuel components. Thus, the discharge of unburned fuel is further reduced. In addition, swirls are also generated in the combustion chamber as the exhaust gas is sucked out to the intake port side, so that mixing is also accelerated.

Figure 7A:
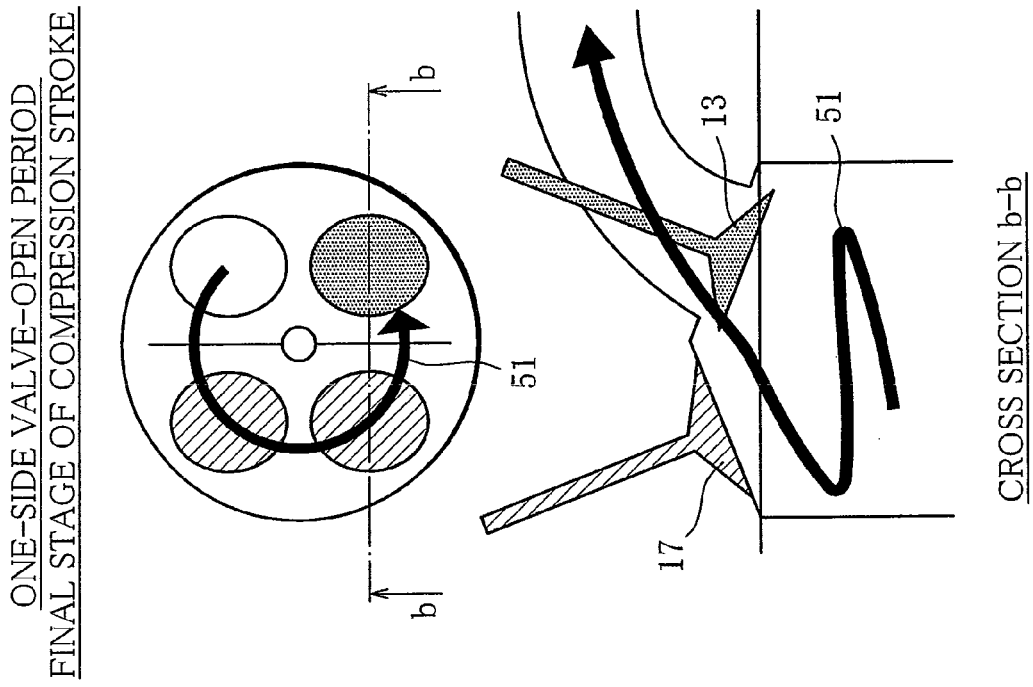
Figure 7B:
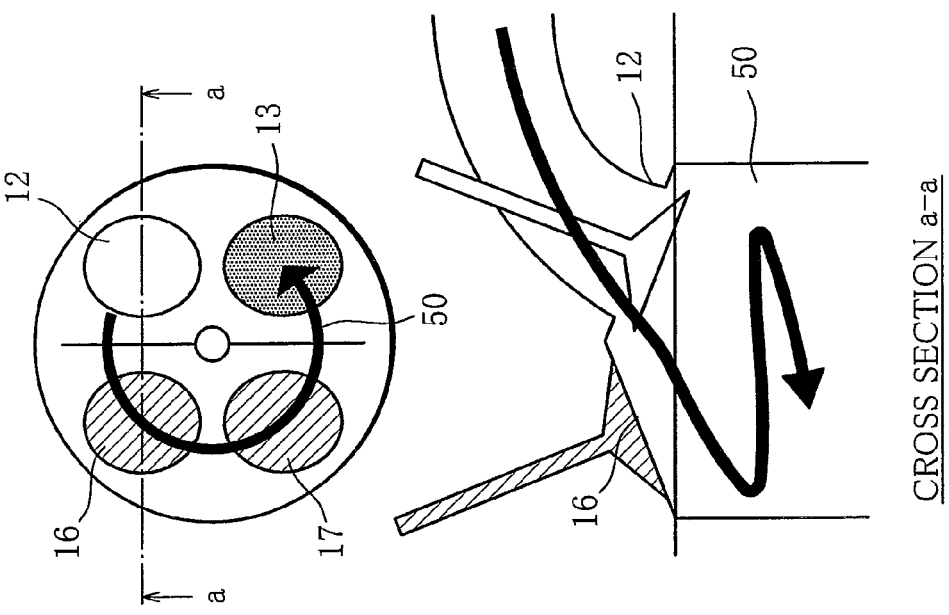

According to the present embodiment, moreover, the intake port 19 extends from the right, so that the intake air passed through the intake port 19 can easily smoothly flow to the left into the combustion chamber 18, which is pent-roof-shaped. If the opening and closing timings of one of the two intake valves are delayed as the valve-open period is extended in the low-load mode, furthermore, a one-side valve-open period during which only the first intake valve 12 is open is provided in the initial stage of the intake stroke, as shown in FIG. 7A. Thus, the intake air introduced into the combustion chamber 18 through the first intake valve 12 flows counterclockwise as illustrated in the combustion chamber. Since the second intake valve 13 is then closed, a swirl 50 can be enhanced without countervailing the intake air that flows counterclockwise. As shown in FIG. 7B, on the other hand, the one-side valve-open period during which only the second intake valve 13 is open is provided in the first half of the compression stroke, so that the intake air in the combustion chamber 18 blows back from the second intake valve 13 into the intake port 19 while flowing counterclockwise as the piston ascends. Thus, a swirl 51 of the intake air in the combustion chamber 18 can be maintained even while the intake air is blowing back.

According to the present embodiment, as described above, swirls can be enhanced even in the low-load mode based on the control of the opening and closing timings of the second intake valve 13 only and the arrangement of the intake port 19 and the intake valves 12 and 13. Therefore, gasification of the fuel and its mixing with air are accelerated, and the temperature of the gas mixture in the cylinder can be increased by heat received from the wall surface of the cylinder despite the low actual compression ratio. Thus, combustion can be stabilized. Further, the gas mixture, once sucked in, is pushed back into the intake port 19, so that counterclockwise swirls can be further enhanced in the combustion chamber 18. Accordingly, the fuel gasification can be further accelerated to improve combustibility. While the gas mixture pushed back into the intake port is sucked in again in the next stroke, moreover, the gasification and mixing are advanced beforehand, so that combustibility is further improved.

Since the combustion in the low-load mode is stabilized, furthermore, the closing timings of the intake valves can be delayed. Thus, pumping loss can be mitigated, so that the fuel efficiency can be greatly improved.

In the present embodiment, in particular, the open period of the second intake valve 13 is set to be longer than that of the first intake valve 12, so that the valve-open period of the intake valve means as a whole can be greatly changed by varying the phase of the second intake cam 11. Thus, the pumping loss mitigation effect can be enhanced.

Since the open period of the first intake valve 12 is different from that of the second intake valve 13, moreover, the one-side valve-open period during which one of the first and second intake valves 12 and 13 is open is provided within the intake valve-open period without regard to variation of the open period of the second intake valve 13. Thus, reduction of swirls by interference between intake airflows in the combustion chamber can be suppressed, so that combustion stability can be secured. Even in the start mode or low-speed, high-load mode, in particular, swirls are quickly generated in the one-side valve-open period during which only the second intake valve 13 is open in the initial stage of the valve-open period. Consequently, combustibility is improved to enhance the exhaust performance.

In the low-load mode, furthermore, curves that represent the respective lifts of the first and second intake valves 12 and 13 intersect at a value greater than half the maximum lift when the second intake cam 11 is controlled for the most delayed angle. Therefore, a high flow rate can be secured for the intake air at this intersection, that is, a point in time when the respective lifts of the intake valves 12 and 13 are equal. Thus, in the low-load mode, the high intake air flow rate can be secured to further improve combustibility.

Further, the cam phase change mechanism formed of a vane-type actuator is used as the mechanism for changing the closing timing of the second intake valve 13. Therefore, friction can be reduced when compared with the case of a mechanism that changes the closing timing of an intake valve by increasing or reducing the valve lift, and the operation reliability and durability of the valve train can be improved.

The present invention is not limited to the three modes of operation setting for the cam phase change mechanism 20 shown in FIGS. 6A to 6C, and these modes may be set in a continuously variable manner based on the properties of the engine, for example.

Although the phase of the second intake valve is varied according to the embodiment described herein, moreover, the range of phase variation can be extended if the phase of the first intake valve 12 is also variable.

What is claimed is:

1. An internal combustion engine with a variable valve gear, comprising:
    a first intake valve and a second intake valve for each cylinder, configured to be driven by a first intake cam and a second intake cam, respectively; and
    a cam phase change mechanism configured to vary at least the phase of the second intake cam,
    wherein the second intake cam is set such that the open period of the second intake valve is longer than that of the first intake valve,
    wherein if the second intake cam is controlled for the most delayed angle by the cam phase change mechanism, the open period of the second intake valve is delayed with respect to that of the first intake valve and the closing timing of the second intake valve is delayed to a timing closer to a top dead center of a compression stroke than to a bottom dead center of the compression stroke, and wherein if the second intake cam is controlled for the most advanced angle by the cam phase change mechanism, the closing timing of the second intake valve is set to a timing substantially coincident with that of the first intake valve, such that a one-side valve-open period during which only the second intake valve is open is provided in an initial stage of the open period of the second intake valve.

2. The internal combustion engine with a variable valve gear according to claim 1, wherein if the second intake cam is controlled for the most delayed angle by the cam phase change mechanism, respective lifts of the first and second intake valves are greater than half the maximum lift of the first or second intake valve when the respective lifts are equal.

3. The internal combustion engine with a variable valve gear according to claim 1, wherein a combustion chamber of the internal combustion engine is pent-roof-shaped, and a valve hole configured to be opened and closed by the first intake valve and a valve hole configured to be opened and closed by the second intake valve are located at positions offset from a center of the combustion chamber.

* * * * *